May 24, 1966 E. KETTEL 3,253,223

PULSE PHASE MODULATION RECEIVER

Filed March 28, 1962 3 Sheets-Sheet 1

INVENTOR
Ernst Kettel
BY George H. Spencer
ATTORNEY

INVENTOR
Ernst Kettel
BY George B. Spencer
ATTORNEY

May 24, 1966 E. KETTEL 3,253,223

PULSE PHASE MODULATION RECEIVER

Filed March 28, 1962 3 Sheets-Sheet 3

INVENTOR
Ernst Kettel

BY George W. Spencer

ATTORNEY

United States Patent Office 3,253,223
Patented May 24, 1966

3,253,223

PULSE PHASE MODULATION RECEIVER

Ernst Kettel, Ulm-Soflingen (Danube), Germany, assignor to Telefunken Patentverwertungs-G.m.b.H., Ulm (Danube), Germany

Filed Mar. 28, 1962, Ser. No. 183,220
Claims priority, application Germany, Mar. 30, 1961, T 19,892
7 Claims. (Cl. 325—321)

The present invention relates generally to the transmission of data and, more particularly, to a receiver for use in pulse transmission using a quantized phase modulated carrier.

In such a data transmission system, pulses are generated which are time-wise spaced $T_0$, so that this system can thus transmit $1/T_0$ steps per second. In the simplest case of quantized pulse values, each pulse may assume the values 0 and 1, or $-1$ and $+1$. In this case, a binary system is provided having 1 bit of information per pulse. If the signal-to-noise ratio of the system permits the differentiation of $k$ different values for each pulse, then each pulse has the information of $1d(k)$ bits whereby $1d$ is the dyadic logarithm. The transmission speed of this system is $1d(k)/T_0$ baud. Furthermore, it is assumed that the transmission is accomplished using a carrier $\omega_0$, whereby the $k$ different values of a pulse are represented by $k$ phase positions in the carrier.

FIGURE 1 diagrammatically illustrates quantized phase modulation. This figure illustrates a phase reference plane having the real axis $x$ and the imaginary axis $y$. This plane is defined with reference to a given carrier cos $(\omega_0 t)$. This carrier represents a unit vector disposed along the $x$ axis. In this plane $A \cos(\omega_0 t+\phi)$ is a vector of the length A which is rotated in a counterclockwise direction by the angle $\phi$ with respect to the $x$ axis. Such a signal vector having an angle $\phi_n$, which is unequivocally assigned to $n$, corresponds to a modulation pulse of the value $n$. With $k$ number of preferably equidistant phase positions, the signal vector may assume one of these $k$ phase positions for the duration of the pulse which produced this signal vector. A pulse of the value $n$ then produces a signal which is represented by $$A \cos\left(\omega_0 t+\frac{2\pi n}{k}\right)$$

In FIGURE 1, it is assumed that $k=8$, and the eight phase positions are numbered consecutively from 1 to 8. In this case, each pulse contains three information bits.

A demodulator for quantized phase modulation determines the phase of the received signal, and from this the respective value of $n$ is determined. The determination of the phase is always possible only with reference to a given coordinate system, i.e., with reference to a given carrier. Any selected carrier cos $(\omega_0 t)$ used in the transmitter thus has to be reproduced in the receiver by means of an oscillator and must be synchronized with respect to frequency and phase along the transmission path.

The construction of a demodulator is shown in FIGURE 2. Demodulation is performed by multiplication in two multipliers 1, 2. The received signal is applied to the input of each multiplier; however, at their second inputs they receive separate carrier phases. The demodulating carrier cos $(\omega_0 t)$ is used for one multiplier, and the carrier $-\sin(\omega_0 t)$ which is in phase quadrature thereto is used for the other. If the signal $$A \cos\left(\omega_0 t+\frac{2\pi n}{k}\right)$$

is present at the input of the receiver for the duration of one pulse, the output values which appear at the two outputs of the demodulator after the separation of the carrier frequency components by means of the low-pass filters 3, 4 are as indicated by Equations 1. (For these and the other equations referred to hereinafter, see the Appendix following the specification.)

These values are the values of the signal vector components with reference to the coordinate system defined by the reference carrier. By means of these values, the respective, transmitted phase position, i.e., the value of $n$, is unequivocally determined.

In a receiver of the type illustrated in FIGURE 2, there is a problem in synchronizing the local oscillator. This synchronization can be carried out by mixing pulses with known phase position, for instance $n=0$, into the transmission, at greater time intervals, and relating the phase of the oscillator to these pulses. This is a control process having a relatively large amount of inertia and the system thus fails in transmission systems where faster phase or frequency variations occur.

These difficulties may be overcome in a known manner wherein the reference phase is not represented by the presence of a carrier, but by the phase of the preceding pulse signal. The information is thus represented by the phase difference of two chronologically successive pulses. The modulation must then be carried out in a corresponding manner. For instance, if a first signal represents the value $$A \cos\left(\omega_0 t+\frac{2\pi n_0}{k}\right)$$

whereby $n_0$ is dependent upon the antecedent information, and if the following pulse has the value $n_2$, the corresponding signal of $n_2$ is $$A \cos\left(\omega_0 t+\frac{2\pi(n_0+n_2)}{k}\right)$$

In order to demodulate this signal in an arrangement of the type illustrated in FIGURE 2, the receiver must be capable of storing the phase of the preceding pulse, i.e., to apply the carriers $$\cos\left(\omega_0 t+\frac{2\pi n_0}{k}\right) \text{ and } -\sin\left(\omega_0 t+\frac{2\pi n_0}{k}\right)$$

to the multipliers during the second pulse. Thus, the receiver determines the components of a received signal in the phase reference plane defined by the phase of the preceding pulse. As a result of this, Equations 1 are applicable, with $n=n_2$, i.e., the desired information.

The process is carried out as follows. In the receiver, a very finely-tuned circuit tunes itself to oscillate at the frequency and phase of a first received pulse during the duration of this pulse and then, while continuing to oscillate at the adjusted frequency, demodulates the second pulse by delivering the correct carrier phases to the multipliers for the duration of this second pulse. The oscillating circuit then ceases and can thereafter adjust its oscillation to the frequency and phase of the third pulse. In order to be able to demodulate all of the pulses, two alternately operating oscillating circuits are necessary. This process is complicated and can only be used when the individual pulses do not noticeably overlap with respect to time and at least a few carrier cycles occur during the duration of one pulse.

With these defects of the prior art in mind, a main object of the present invention is to provide a receiver for use in reception during pulse transmission of a quantized phase modulated carrier which is simpler than and free of the above-mentioned disadvantages of the prior art.

Another object is to eliminate any need for storing the carrier phases by means of oscillating circuits.

A further object is to provide a receiver of the type described wherein only the components of the preceding pulse need be stored and wherein these components are demodulated with any desired carrier phase.

Additional objects and advantages of the present invention will become apparent upon consideration of the following description when taken in conjunction with the accompanying drawings in which.

Figure 1:
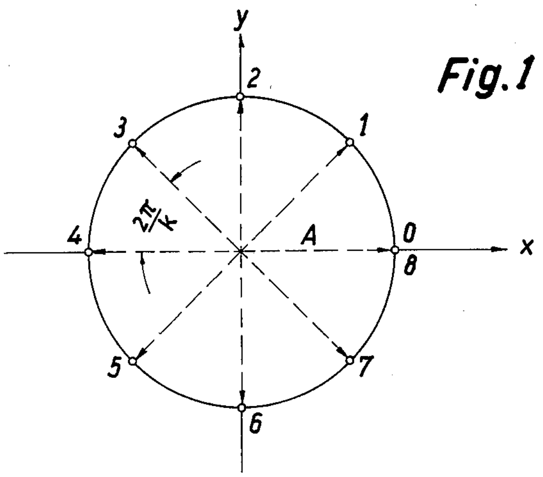
FIGURE 1 is a diagrammatic view illustrating the theory of quantized phase modulation of pulses.
Figure 2:
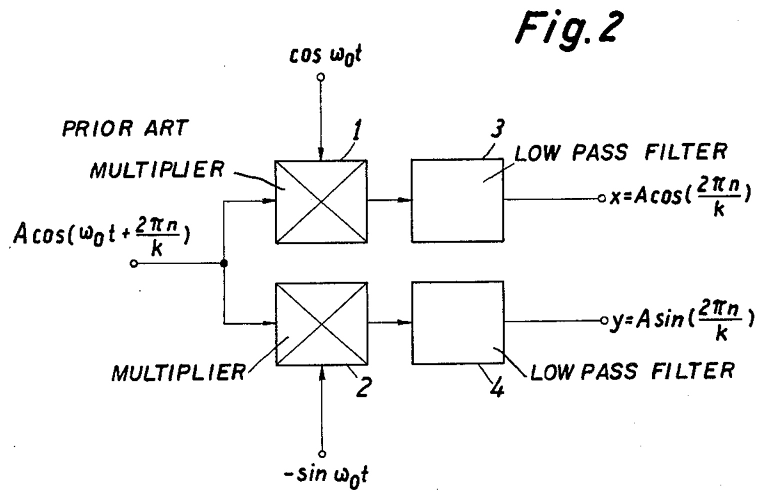
FIGURE 2 is a block diagram of a prior art device.
Figure 3:
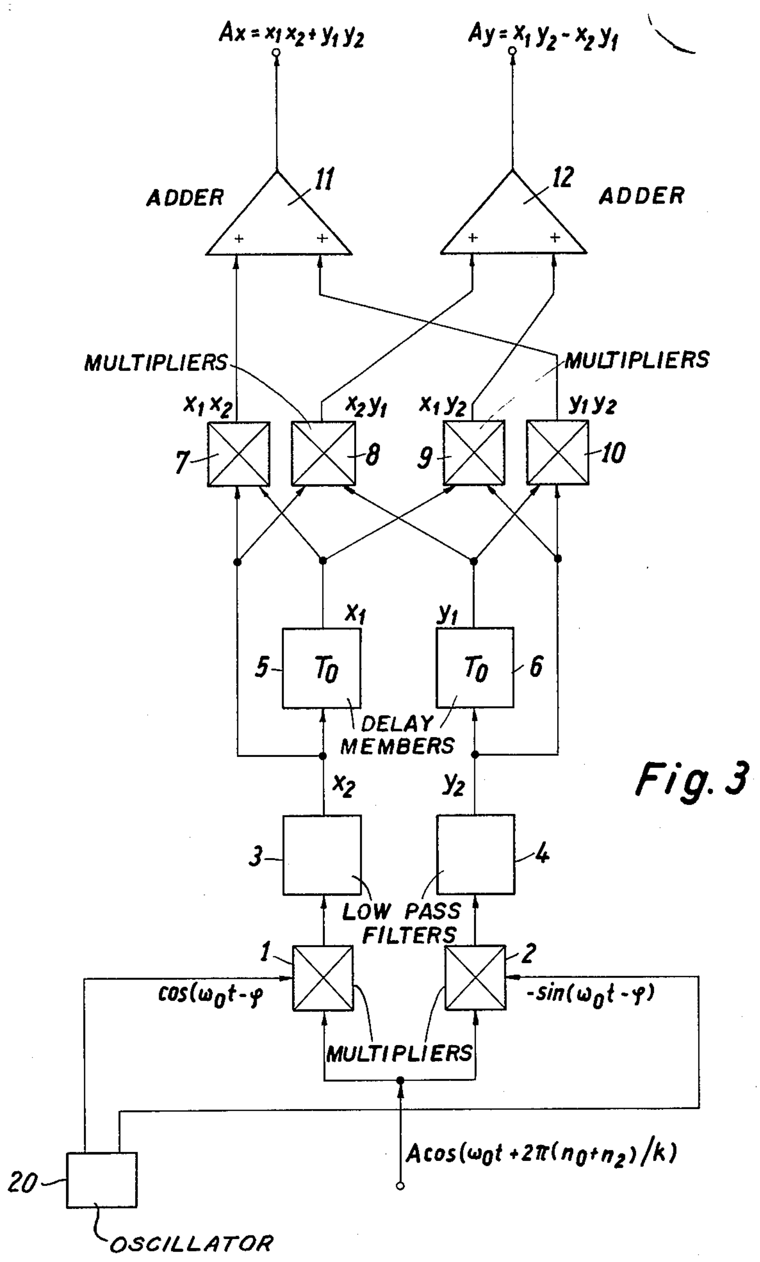
FIGURE 3 is a block diagram of a receiver according to the present invention.

With more particular reference to the drawing, FIGURE 3 shows a device wherein the information is represented by the phase difference of two successive pulses. The receiver has a continuously operating oscillator 20 which has the correct frequency $\omega_0$, but a phase $\phi$, which may have any desired value. It will be shown below that there may be a frequency difference with respect to the received signals. That instant is considered at which a pulse designated with the index 1 and which had the phase $$\frac{2\pi n_0}{k}$$

has ended and a second pulse (index 2) is received with the information $n_2$. This new pulse has the phase $$\frac{2\pi(n_0+n_2)}{k}$$

and thus provides the two components, indicated in Formulas 2, after demodulation in the multiplier 1, 2 and after separation of carirer frequency components by means of the low-pass filters 3, 4.

The value $n_2$ cannot be determined from these two components because $n_0$ and $\phi$ are not known. In FIGURE 3, the low-pass filters are followed by members 5, 6 having a respective transit time $T_0$. At the instant considered, i.e., when the components according to equations 2, of the second pulse are present at the inputs of the delay members the two components of the preceding pulse are present at the outputs of members 5, 6. These components, which correspond to Equations 2, are indicated in Equations 3.

Another object of the present invention is to eliminate the values $n_0$ and $\phi$ from Equations 2 by means of an electrical computation process and with the aid of Equations 3, to thus obtain the components of the desired information $n_2$. For this purpose, the products $x_1x_2, x_1y_2, x_2y_1$, and $y_1y_2$ are formed in four multipliers 7, 8, 9, 10. An adder 11 forms a first output of the demodulator as indicated in Equations 4.

The adder 12 forms the second output of the demodulator as indiacted in Equations 5.

The Equations 4 and 5 provide the desired components of the information $n_2$. The system shown in FIGURE 3 delivers the components without the need for a phase-locked carrier in the receiver. Instead of the need for storing the carrier phases by means of oscillating circuits, as described in connection with the system mentioned previously, in this system only the components of the preceding pulse need be stored. These components are demodulated with any desired carrier phase.

Now it is assumed that the local oscillator of the receiver had the phase $\phi$ only at the time of the first pulse. Thus, Equations 3 apply. Within the time interval $T_0$ until the next pulse, the phase will have changed by $-\Delta\phi$. Thus, $\phi-\Delta\phi$ is to be inserted into the Equations 2. This results in the new output values having the phase error $\Delta\phi$ in the receiver according to FIGURE 3, instead of yielding the correct values (4) (5). This is indicated in Equations 6.

The demodulation is thus performed with reference to a phase plane which is incorrectly oriented by the value $\Delta\phi$. If $\Delta\phi$ is small in comparison to the smallest distance between two of the quantized phases as indicated in Equation 7, then no error occurs in the determination of $n_2$. The assumed phase error within the time interval $T_0$ produces a frequency aberration of the received frequency as compared to the frequency of the oscillator in the receiver, and this aberration has the value $$\Delta\omega=\frac{\Delta\phi}{T_0}$$

Thus, the local oscillator needed for the system of FIGURE 3 does not require adjustment of the frequency by means of the received signals as long as its aberration from the correct frequency is no greater than as indicated in Equation 8.

Accordingly, in a system wherein $k=8$, there is a permissible freqency error of 2.5% of the pulse synchronizing frequency.

Figure 4:
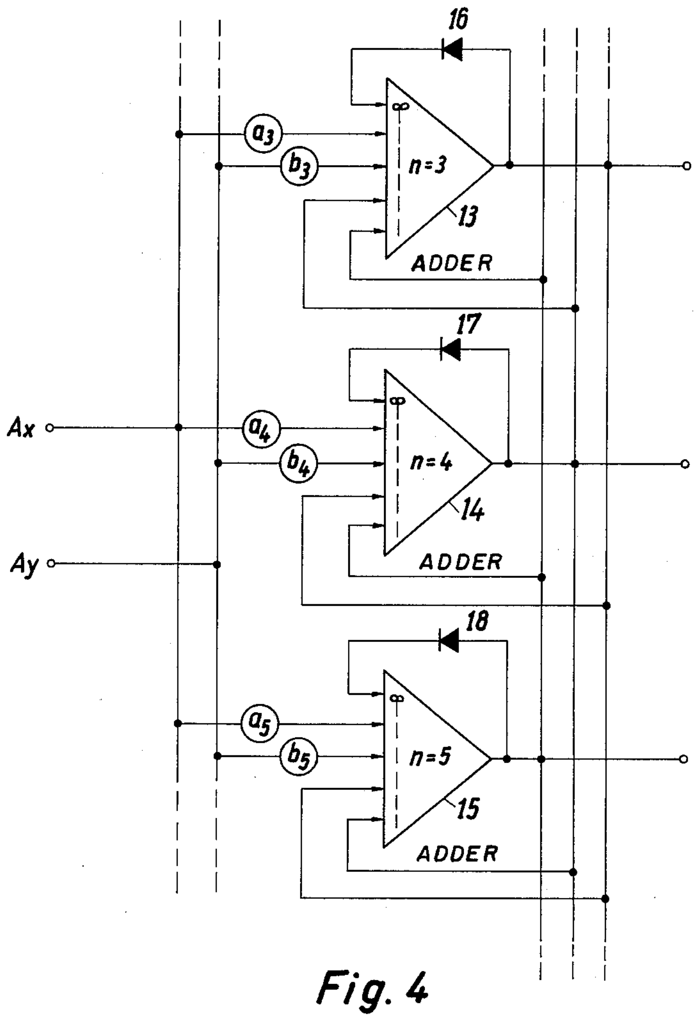
FIGURE 4 is a block diagram of a device for determining the desired information from the components at the outputs of the receiver of FIGURE 3.

The manner in which the information $n_2$ may be determined from the components (4) (5), i.e., the outputs of the system according to FIGURE 3 will be explained below. One embodiment of such an arrangement is illustrated in FIGURE 4. In this device a decision must be rendered as to which one of the numbers from 1 to $k$ corresponds to the value $n_2$. For this purpose, $k$ number of adders are provided, of which three are shown in FIGURE 4. Each adder has one of the numbers 1 to $k$, correlated therewith, and in each case only the adder correlated with the number which corresponds to $n_2$ will respond, and all the others will be blocked.

For this purpose, the adders 13 to 15 are controllable only in one way, and which, as is shown in FIGURE 4, may be accomplished, for example, by providing feedback via rectifiers 16, 17, 18. With the illustrated polarity, the output can only be controlled with respect to negative values. In general, the adders may be of the type used in analog computers, whereby the output voltage is equal to the negative sum of all inputs. In the present case, due to the limitation, this is only true when the sum of all inputs is positive. Each adder has two inputs which are fed from the outputs of the demodulator of FIGURE 3. However, each adder provides a different coefficient to these inputs. For the $i$th adder these factors are $a_i$ for the first input, and $b_i$ for the second input, and these values are defined in Equations 9.

The evaluated input value of this adder is then as indicated in Equations 10. Thus, the adder with $i=n_2$ receives the maximum input. In the device of FIGURE 4 negative feedback is provided from each output of the adders to all of the other adders, and the adder with the maximum input is thus capable of blocking all the other adders. For this reason, there is always only one adder which produces the control value $-A^2$ at its output. All the other adders have 0 output and the number of this adder is identical to the number of the transmitted phase difference.

The above-described demodulation process wherein by means of the calculating process illustrated in connection with FIGURE 3, and with the aid of Equations 3, the values $n_o$, $\phi$, are eliminated from the Equations 2, is different from a process described by Harmuth in Communication and Electronics (July 1960), 221–228. In this article, a process is described in which the carriers in the receiver do not have to be phase-blocked with respect to the received signals. According to this article, the phase error is eliminated by the same calculating processes as disclosed above in connection with Equations 4, 5, (Equation 16 in Harmuth). However, according to this article, the information is represented by the phase, and not by the phase difference.

Thus, in the equations corresponding to Equations 2 only $\phi$ has to be eliminated. For this purpose, auxiliary magnitudes cos $\phi$, sin $\phi$ are needed and which are for the same purpose in the Harmuth process as Equations 3 in the present case. However, in the conventional process, these auxiliary magnitudes are transmitted separately from the information in a second frequency modulated channel. Thus, only the formal calculating operations which are carried out by means of two component pairs, are the same in Harmuth and the present invention. The new process described herein does not require an auxiliary channel for the elimination of the errors of the oscillator in the receiver, as is the case in the Harmuth process. The present invention accomplishes this by using the components of the preceding pulse.

It will be understood that the above description of the present invention is susceptible to various modifications, changes, and adaptations, and the same are intended to be comprehended within the meaning and range of equivalents of the appended claims.

*Appendix*

Number: Equation (1) $x=A\cos\frac{2\pi n}{k}$ $y=A\sin\frac{2\pi n}{k}$ (2) $x_2=A\cos\left(\frac{2\pi(n_0+n_2)}{k}-\phi\right)$ $y_2=A\sin\left(\frac{2\pi(n_0+n_2)}{k}-\phi\right)$ (3) $x_1=A\cos\left(\frac{2\pi n_0}{k}-\phi\right)$ $y_1=A\sin\left(\frac{2\pi n_0}{k}-\phi\right)$ (4) $Ax=x_1x_2+y_1y_2=A^2\left[\cos\left(\frac{2\pi(n_0+n_2)}{k}-\phi\right)\cdot\cos\left(\frac{2\pi n_0}{k}-\phi\right)+\sin\left(\frac{2\pi(n_0+n_2)}{k}-\phi\right)\cdot\sin\left(\frac{2\pi n_0}{k}-\phi\right)\right]=A_2\cos\frac{2\pi n_2}{k}$ (5) $Ay=y_2x_1-x_2y_1=A^2\left[\sin\left(\frac{2\pi(n_0+n_2)}{k}-\phi\right)\cdot\cos\left(\frac{2\pi n_0}{k}-\phi\right)-\cos\left(\frac{2\pi(n_0+n_2)}{k}-\phi\right)\cdot\sin\left(\frac{2\pi n_0}{k}-\phi\right)\right]=A^2\sin\frac{2\pi n_2}{k}$ (6) $Ax=A^2\cos\left(\frac{2\pi n_2}{k}+\Delta\phi\right)$ $Ay=A^2\sin\left(\frac{2\pi n_2}{k}+\Delta\phi\right)$ (7) $\Delta\phi\ll\frac{2\pi}{k}$ (8) $\Delta f=\frac{\mu}{kT_0},\ \mu\leqq 1/5$ (9) $a_i=\cos\frac{2\pi i}{k}$ $b_i=\sin\frac{2\pi i}{k}$

(10) $Axa_i+Ayb_i=A^2\left[\cos\frac{2\pi n_2}{k}\cdot\cos\frac{2\pi i}{k}+\sin\frac{2\pi n_2}{k}\cdot\sin\frac{2\pi i}{k}\right]=A^2\cos\frac{2\pi(n_2-i)}{k}$

What is claimed is:

1. In a pulse transmission system using quantized phase modulation of a carrier with the desired information being the phase difference between two successive pulses, and having a receiver including a receiving oscillator, two multiplicatively effective demodulators both fed a voltage which is received and each fed with a voltage having an oscillating frequency produced in the receiver by the receiving oscillator and with the voltages provided thereby being in phase quadrature with each other, low-pass filters for separating the carrier frequency components for forming the output components $x_2$, $y_2$, with respect to the phase plane defined by the receiving oscillator, from the received vector of the signal, the improvement that the receiving oscillator has any desired phase difference, and comprising means for storing signals representative of the corresponding output components $x_1$, $y_1$ of the preceding pulse for the duration of one pulse and connected to said low-pass filters, and means connected to said low-pass filters and also to said storing means for eliminating the undetermined phases contained in the signals representative of the component pair $x_2$, $y_2$ from the two available component pairs.

2. In a pulse transmission system using quantized phase modulation of a carrier with the desired information being the phase difference between two successive pulses, and having a receiver including a receiving oscillator, two multiplicatively effective demodulators both fed with a received voltage and each fed with a voltage having an oscillating frequency produced in the receiver by the receiving oscillator and with the voltages produced thereby being in phase quadrature with each other, low-pass filters for separating the carrier frequency components thus forming the output components $x_2$, $y_2$, which are proportional to the rectangular components of the received vector with respect to the phase plane defined by the receiving oscillator, the improvement that the receiving oscillator has any desired phase difference, and comprising means connected to said low-pass filters for storing the time dependent signals $x_2$, $y_2$ for the duration of one pulse thus attaining from $x_2$ the retarded component $x_1$ and from $y_2$ the retarded component $y_1$, and means connected to said low-pass filters and also to said storing means for forming according to the relationships $$x=x_1\cdot x_2+y_1\cdot y_2 \text{ and } y=x_1y_2-x_2y_1$$

the two rectangular components, $x$, $y$ of a new vector, the phase of which is the desired information and is equal to the phase difference between the two vectors defined by the component pairs $x_1$, $y_1$ and $x_2$, $y_2$.

3. A system as defined in claim 2 comprising an assembly of $k$ adders connected for receiving two outputs $x$, $y$ which are the rectangular components of a vector, the phase of which is the desired information and there being $k$ possible phases of the vector, each adder having two inputs, one connected to receive the $x$ component and the other connected to receive the $y$ component and using a valuation factor for the former which is proportional to $$\cos\frac{2\pi i}{k}$$

and for the latter which is proportional to $$\sin\frac{2\pi i}{k}$$

where $i$ is any particular value of $k$ so that the $i$th of the $k$ adders is arranged to detect the $i$th of $k$ information values, and each adder being arranged to block all other adders when it is actuated.

4. A system as defined in claim 2, wherein said component forming means includes multipliers and adders.

5. A receiver for a pulse transmission system using quantized phase modulation of a carrier with the desired information being the phase difference between two successive pulses, said receiver comprising, in combination:

(a) two multipliers each having two inputs and one output, one of the inputs being adapted to receive a signal voltage;

(b) a receiver oscillator for producing two voltages in phase quadrature with each other for feeding each voltage to the respective other inputs of said multipliers and providing any desired phase difference;

(c) a low-pass filter connected to each multiplier for separating the carrier frequency components for forming signals representative of the components $x_2$, $y_2$, with respect to the phase plane defined by the receiving oscillator, from the received vector of the signal;

(d) means connected to said low-pass filters for storing signals representative of the corresponding components $x_1$, $y_1$ of the preceding pulse for the duration of one pulse; and (e) means connected to said low-pass filters and said storing means for eliminating from the signals applied thereto the undetermined phases contained in the component pair $x_2$, $y_2$ from the two available component pairs.

6. A receiver for a pulse transmission system using quantized phase modulation of a carrier having $k$ number of quantization values and with the desired information $n_2$ being the phase difference between two successive pulses, and the previous information being $n_0$, said receiver comprising, in combination:

(a) two multipliers each having two inputs and one output, one of the inputs being adapted to receive the signal voltage $$A \cos\left[\omega_0 t + \frac{2\pi(n_0+n_2)}{k}\right]$$

where A represents amplitude, $\omega_0$ represents frequency, and $t$ represents time;

(b) a receiver oscillator for producting two voltages in phase quadrature with each other for feeding each voltage to the respective other inputs of said multipliers and providing any desired phase difference; said voltages being $$\cos(\omega_0 t - \phi) \text{ and } -\sin(\omega_0 t - \phi)$$

respectively, where phase $\phi$ has any desired value;

(c) a low-pass filter connected to each multiplier for separating the carrier frequency components for forming signals representative of the components $x_2$, $y_2$, with respect to the phase plane defined by the receiving oscillator, from the received vector of the signal; with these signals being formed according to the functions $$x_2 = A \cos\left(\frac{2\pi(n_0+n_2)}{k} - \phi\right)$$

$$y_2 = A \sin\left(\frac{2\pi(n_0+n_2)}{k} - \phi\right)$$

where $\phi$ represents the phase; and (d) means connected to said low-pass filters for storing signals representative of the corresponding components $x_1$, $y_1$ of the preceding pulse for the duration of one pulse; and (e) means connected to said low-pass filters and said storing means for eliminating from the signals applied thereto the undetermined phases contained in the component pair $x_2$, $y_2$ from the two available component pairs and for combining the signals representing the component pair to provide information $n_2$.

7. A receiver for a pulse transmission system using quantized phase modulation of a carrier with the desired information being the phase difference between two successive pulses, said receiver comprising, in combination:

(a) two multipliers each having two inputs and one output, one of the inputs being adapted to receive a signal voltage;

(b) a receiver oscillator for producing two voltages in phase quadrature with each other for feeding each voltage to the respective other inputs of said multipliers and providing a small frequency difference with respect to the received carrier;

(c) a low-pass filter connected to each multiplier for separating the carrier frequency components for forming signals representative of the components $x_2$, $y_2$, with respect to the phase plane defined by the receiving oscillator, from the received vector of the signal;

(d) means connected to said low-pass filters for storing signals representative of the corresponding components $x_1$, $y_1$ of the preceding pulse for the duration of one pulse; and (e) means connected to said low-pass filters and said storing means for eliminating from the signals applied thereto the undetermined phases contained in the component pair $x_2$, $y_2$ from the two available component pairs.

References Cited by the Examiner

UNITED STATES PATENTS 3,045,180 7/1962 Losher ............... 332—22

NATHAN KAUFMAN, *Acting Primary Examiner.*

ALFRED L. BRODY, *Examiner.*